(12) United States Patent
Do et al.

(10) Patent No.: US 8,523,503 B2
(45) Date of Patent: Sep. 3, 2013

(54) THREADED JOINT AND METHOD OF SEALING A THREADED JOINT

(75) Inventors: Vinh Do, Houston, TX (US); Jeffrey Raynal, Houston, TX (US); Mayur Mansukh, Houston, TX (US)

(73) Assignee: Nuovo Pignone, S.p.A., Florence (IT)

( * ) Notice: Subject to any disclaimer, the term of this patent is extended or adjusted under 35 U.S.C. 154(b) by 442 days.

(21) Appl. No.: 12/847,254

(22) Filed: Jul. 30, 2010

(65) Prior Publication Data

US 2012/0027539 A1 Feb. 2, 2012

(51) Int. Cl.
*F16B 39/34* (2006.01)

(52) U.S. Cl.
USPC .......... 411/303; 411/302; 411/306; 411/369; 411/432; 411/542

(58) Field of Classification Search
USPC ................ 411/222, 237, 301, 302, 303, 304, 411/306, 369, 378, 371.1, 432, 517, 521, 411/539, 542, 546; 16/2.1, 2.4, 2.2; 73/45.4; 277/312, 628, 630, 637
See application file for complete search history.

(56) References Cited

U.S. PATENT DOCUMENTS

| | | | | |
|---|---|---|---|---|
| 646,898 | A | * | 4/1900 | Deiters .......................... 411/237 |
| 652,530 | A | * | 6/1900 | Bryce ............................ 411/238 |
| 659,215 | A | * | 10/1900 | Doelp ........................... 411/272 |
| 1,607,273 | A | * | 11/1926 | Hecht ........................... 411/432 |
| 1,607,274 | A | * | 11/1926 | Hecht ........................... 411/432 |
| 2,333,388 | A | * | 11/1943 | Poupitch ....................... 411/302 |
| 2,360,531 | A | | 10/1944 | Wojtan |
| 2,502,642 | A | | 4/1950 | Bernard |
| 3,123,245 | A | * | 3/1964 | Dumpis ........................ 220/233 |
| 3,181,899 | A | * | 5/1965 | McKnight, Jr. ............ 285/139.2 |
| 3,259,404 | A | | 7/1966 | Papenguth |
| 3,399,589 | A | * | 9/1968 | Breed ........................... 411/428 |
| 3,435,777 | A | * | 4/1969 | Schaaf ...................... 292/256.71 |
| 3,596,931 | A | | 8/1971 | Mishler |
| 3,871,785 | A | * | 3/1975 | Murvall ........................ 403/259 |
| 4,046,052 | A | * | 9/1977 | Nordstrom ....................... 411/1 |
| 4,458,925 | A | | 7/1984 | Raulins et al. |

(Continued)

FOREIGN PATENT DOCUMENTS

| | | |
|---|---|---|
| GB | 1347783 A | 2/1974 |
| WO | 85/03757 A1 | 8/1985 |
| WO | 02/29290 A2 | 4/2002 |
| WO | 2007/028696 A1 | 3/2007 |

OTHER PUBLICATIONS

Product Catalog, Parker Hannifin Corporation, "Fastners and Fitting Seals," CSS-6431/USA, 2004.

(Continued)

*Primary Examiner* — Roberta Delisle
(74) *Attorney, Agent, or Firm* — Global Patent Operation (57) ABSTRACT

A threaded joint includes a flange, a nut and a flexible seal. The flange, the nut and the flexible seal have threads respective inner surfaces, the threads having shapes complementary to threads on an outer surface of a stem. The flange is configured to allow the stem to move by rotation through the flange. The nut and the flexible seal are configured to move by rotation relative to the stem. The flange has a counter bore and the nut has a groove. The flexible seal has a first portion configured to fill the counter bore in the flange, and a second portion configured to fill the groove of the nut.

20 Claims, 6 Drawing Sheets

(56) References Cited

U.S. PATENT DOCUMENTS

| | | | |
|---|---|---|---|
| 4,696,498 A | | 9/1987 | Church |
| 5,011,162 A | * | 4/1991 | Jelinek .................... 277/644 |
| 5,083,821 A | | 1/1992 | Friend |
| 5,156,421 A | * | 10/1992 | Chauvel .................... 285/40 |
| 5,405,176 A | | 4/1995 | Babel et al. |
| 5,513,859 A | * | 5/1996 | Huber et al. .............. 277/637 |
| 5,628,517 A | | 5/1997 | Jia |
| 5,692,865 A | * | 12/1997 | Pratt ........................ 411/55 |
| 6,439,324 B1 | | 8/2002 | Ringgenberg et al. |
| 6,866,305 B2 | | 3/2005 | Spears |
| 7,628,429 B2 | | 12/2009 | Weisbond |
| 2004/0051254 A1 | * | 3/2004 | Smed ........................ 277/628 |
| 2009/0120940 A1 | | 5/2009 | Shah |

OTHER PUBLICATIONS

EP Search Report and Opinion dated Feb. 15, 2013 from corresponding EP Application No. 11175313 8 4.

* cited by examiner

THREADED JOINT AND METHOD OF SEALING A THREADED JOINT

BACKGROUND

1. Technical Field

Embodiments of the subject matter disclosed herein generally relate to methods and devices for preventing a leak of fluid through a threaded joint.

2. Discussion of the Background

Figure 1:
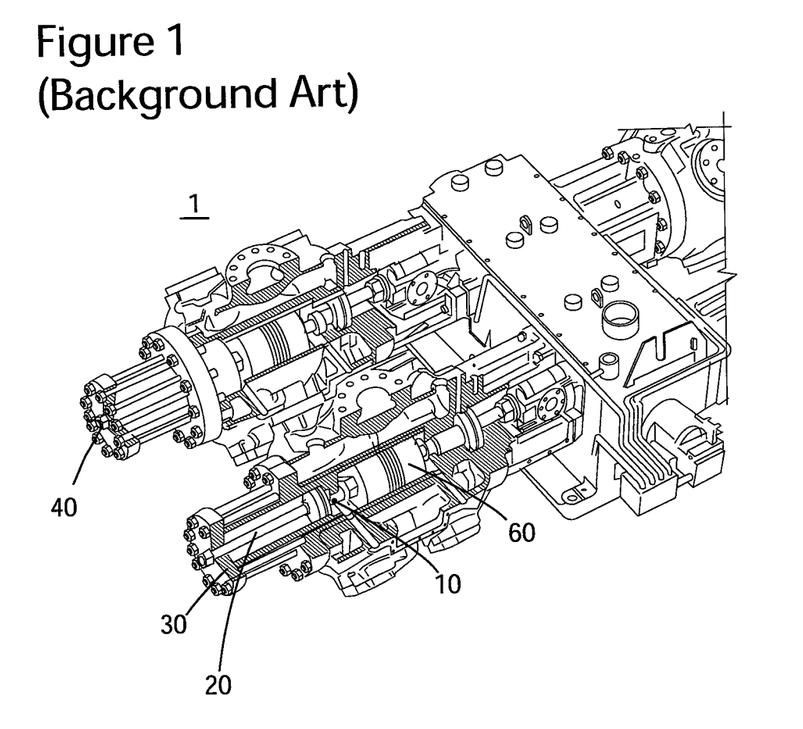
FIG. 1 is a schematic diagram of a reciprocating compressor which is part of a natural gas processing installation.

In a compressor 1 illustrated in FIG. 1, which is a part, for example, of a natural gas processing installation, natural gas is compressed in a chamber 10. A stem 20 projects out of the chamber 10 through a flange 30. The stem 20 is locked to the flange 30 by a nut 40.

A joint having components assembled using complementary threads on their contact surfaces is usually designated as a threaded joint. The stem 20, the flange 30 and the nut 40, which have threads partially covering their outer or inner surfaces, form a threaded joint. The threads on the inner surfaces of the nut 40 and the flange 30 have shapes complementary to the threads on the outer surface of the stem 20. When threads have different and complementary shapes, they are sometimes called male/female threads.

Since a pressure inside the chamber 10 is higher than a pressure outside the chamber, the threaded joint is susceptible to gas leakage. For example, the pressure inside the chamber 10 may increase substantially when a reciprocating piston 60 moves towards the flange 30 thereby decreasing the volume of the chamber 10. A seal (not shown in FIG. 1) placed between the stem 20, the flange 30 and the nut 40 is used to prevent or limit the gas leaking outside the chamber 10.

Extracted natural gas may contain a large proportion of hydrogen sulfide ($H_2S$). Although the hydrogen sulfide is a naturally occurring substance, inhaling air with a large percentage of hydrogen sulfide is poisonous. Therefore, when processing natural gas with a large proportion of hydrogen sulfide, ensuring a good sealing of the natural gas inside the processing installation becomes important for the safety of operators. If natural gas having a large proportion of hydrogen sulfide leaks outside the gas processing installation, the operators may be poisoned while in the vicinity of the installation.

Figure 2:
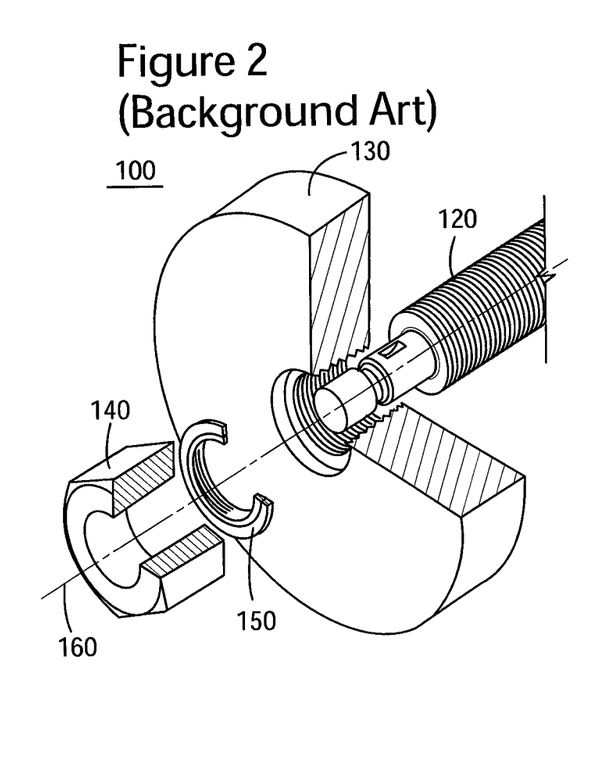
FIG. 2 is an exploded view of a conventional threaded joint.

A conventional threaded joint 100 is illustrated as an exploded view in FIG. 2. The threaded joint 100 includes a stem 120, a flange 130, a nut 140 and a seal 150, arranged along an axis 160, as shown in the figure.

Figure 3:
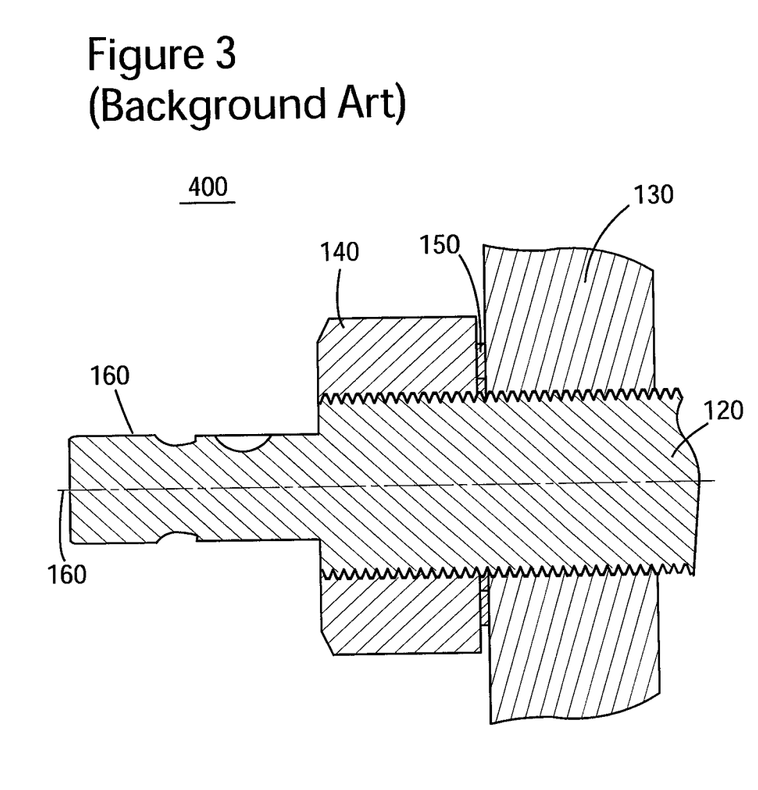
FIG. 3 is a schematic diagram of a cross section of a conventional threaded joint.

A cross section of the threaded joint 100 as assembled is illustrated in FIG. 3. The stem 120 engages with the flange 130 and the nut 140. The seal 150 is mounted between the flange 130 and the nut 140.

Figure 4:
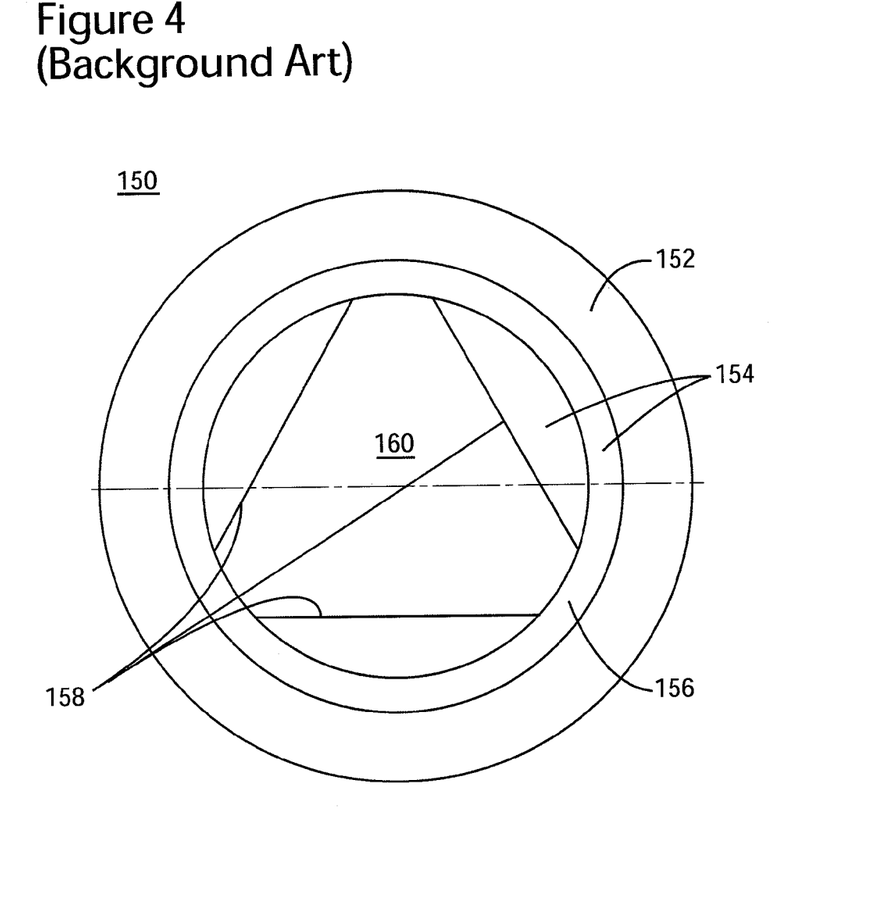
FIG. 4 is a schematic diagram of a flexible seal used in conventional threaded joints.

The seal 150 of the threaded joint 100 is illustrated in FIG. 4 as viewed in a plane perpendicular on the axis 160. The seal 150 includes an outer portion 152, which is a flat metal washer, and a rubber portion 154 attached to an internal rim of the outer portion 152. The rubber portion 154 includes a rubber ring 156 and three rubber flaps 158. Each of the rubber flaps 158 covers a respective area between a chord and a corresponding arch. The arches are equal and equally spaced on a circumference of the rubber ring 156.

Figure 5:
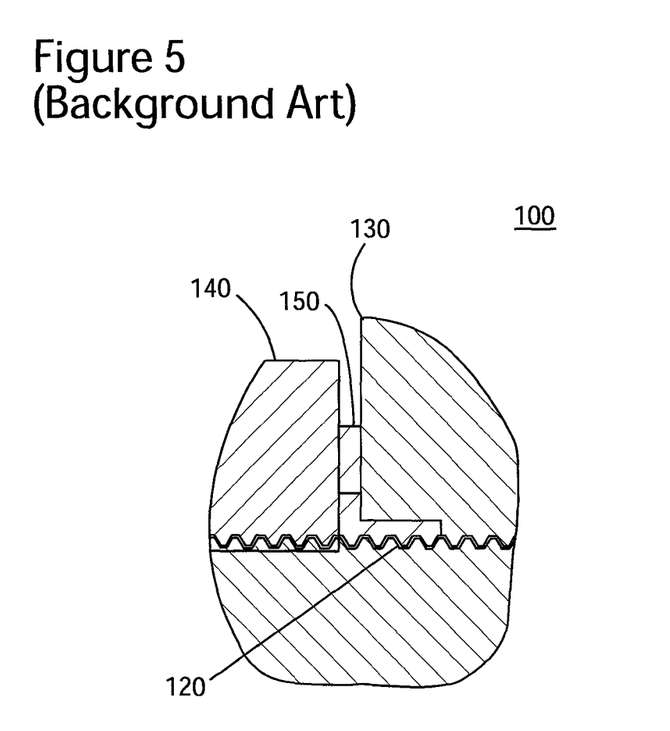
FIG. 5 is an enlarged view of a portion of a conventional threaded joint.

FIG. 5 is an enlarged view of a portion of FIG. 3. When the stem 120, the flange 130, the nut 140 and the seal 150 are assembled, the outer portion 152 (as marked in FIG. 4) of the seal 150 is positioned between the flange 130 and the nut 140. In this configuration, the torque that can be applied to the nut 140 is relatively low.

The rubber flaps 158 are intended to cover the stem 120, inside the flange 130, in a portion in which the flange may have no threads. When the stem 120 advances from right to left along the axis 160, in FIG. 3, the rubber flaps tend to move in the same direction and may become shredded.

It has been observed that after a few movements of the stem 120 along the axis 160, the rubber portion 154 of the seal 150 becomes shredded, and the shredding substantially lowers the capability of the seal 150 to prevent the gas leaking. Therefore, the seal 150 has to be replaced often. The replacement of the seal requires at least a partial disassembly of the compressor, and, therefore, it adds to the downtime of the gas processing installation.

Even if the seal 150 operates at design parameters, in absence of a tight fit ensured when a substantial torque can be applied to the nut 140, the efficiency of the sealing is too low for being safely used when the natural gas has a large proportion of hydrogen sulfide.

Accordingly, it would be desirable to provide systems and methods that avoid the afore-described problems and drawbacks.

SUMMARY

According to one exemplary embodiment, a threaded joint includes a flange, a nut and a flexible seal. The flange has threads on an inner surface and a counter bore, the threads having shapes complementary to threads on an outer surface of a stem. The flange is configured to allow the stem to move by rotation through the flange. The nut of the exemplary embodiment has threads on an inner surface and a groove, the threads of the nut having shapes complementary to the threads on the outer surface of the stem. The nut is configured to move by rotation relative to the stem. The flexible seal of the exemplary embodiment has threads on an inner surface, the threads of the flexible seal having shapes complementary to the threads on the outer surface of the stem. The flexible seal is configured to move by rotation relative to the stem, and has a first portion configured to fill the counter bore in the flange, and a second portion configured to fill the groove of the nut.

According to another exemplary embodiment, a method of sealing a threaded joint is provided. The method includes moving the stem having first threads on an outer surface, through the flange having second threads on an inner surface, the second threads having shapes complementary to the first threads. The method also includes moving a flexible seal having third threads on an inner surface, along the stem, towards the flange, until a first portion of the flexible seal fills a counter bore in the flange, the third threads having shapes complementary to the first threads. Further, the method includes moving a nut having fourth threads on an inner surface, along the stem, towards the flange, until a second portion of the flexible seal fills a groove inside the nut, the fourth threads having shapes complementary to the first threads. The method further includes applying a predetermined torque to the nut after the second portion of the flexible seal has filled the groove inside the nut.

According to another embodiment, a two piece sealing nut for sealing a threaded joint includes a nut and a flexible seal. The nut is configured to surround and move along the stem and has a groove. The flexible seal is configured to surround and move along the stem, inside a flange that holds the stem, and to have a first portion configured to fill a counter bore in the flange, and a second portion configured to fill the groove in the nut.

According to another embodiment, a flexible seal includes a first portion and a second portion. The first portion is configured to fill a counter bore in a flange that holds a threaded stem. The second portion is configured to fill a groove of a nut, and has a diameter different from a diameter of the first portion. The first portion and the second portion have threads on a surface of an inner hole configured to allow the flexible seal to move along the threaded stem, the threads of the flexible seal having shapes complementary to threads on an outer surface of the threaded stem.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a threaded joint in a compressor. However, the embodiments to be discussed next are not limited to threaded joints in compressors, but may be applied to other systems that need to form a leak proofed threaded joint.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 6:
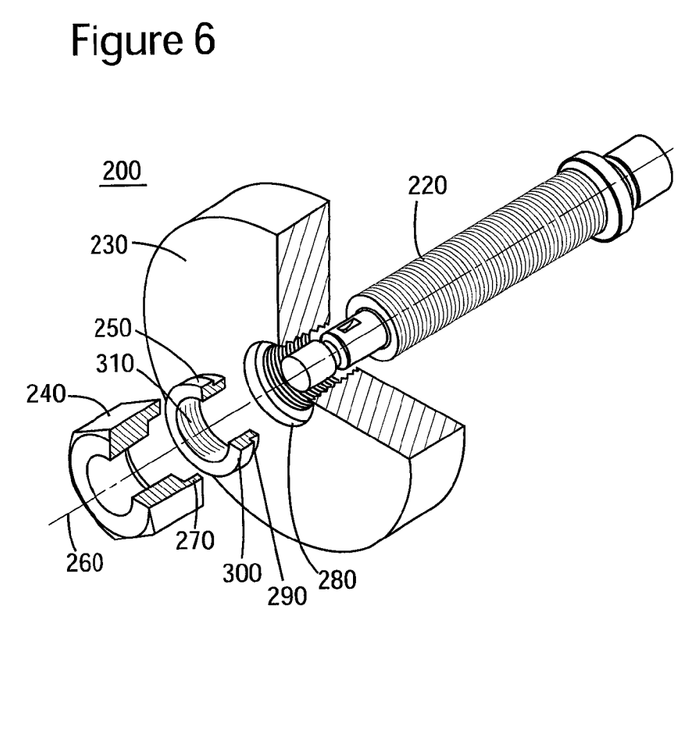
FIG. 6 is an exploded view of a threaded joint according to an embodiment.

FIG. 6 is an exploded view of a threaded joint 200 according to one embodiment. The threaded joint 200 efficiently prevents leaking of fluids, such as natural gas. A stem 220 emerges from a high pressure container (see e.g., the chamber 10 in FIG. 1) through a flange 230. The stem 220 has one end inside the high pressure container and an opposite end outside the high pressure container. Besides the stem 220 and the flange 230, the threaded joint 200 may also include a two piece sealing nut formed by a nut 240 and a flexible seal 250. All the components of the threaded joint 200 have a common axis 260.

The flange 230, the nut 240 and the flexible seal 250 have threads on at least a portion of their respective inner surface. These threads have shapes complementary to threads on the outer surface of the stem 220.

The nut 240 has an inside groove 270 on an end which is assembled towards the flange 230. The flange 230 has a counter bore 280 inside the flange, on an end which is assembled towards the nut 240. A diameter of the groove 270 may be larger than a diameter of the counter bore 280.

The flexible seal 250 is configured to partially fit inside the counter bore 280 of the flange 230 and partially inside the groove 270 of the nut 240. Specifically, the flexible seal 250 has a first portion 290 shaped to fill the counter bore 280, and a second portion 300 shaped to fill the groove 270. The first portion 290 and the second portion 300 may have different diameters. In one application, the first portion 290 of the flexible seal 250 has an external diameter smaller than an external diameter of the second portion 300.

The flexible seal 250 has a middle hole, and threads 310 located on an inner surface around the middle hole. The threads 310 have shapes complementary to the threads on the stem 220. Thus, the flexible seal 250 is configured to move along the axis 260 relative to the stem 220, when the flexible seal 250 and/or the stem 220 rotate around the axis 260.

Figure 7:
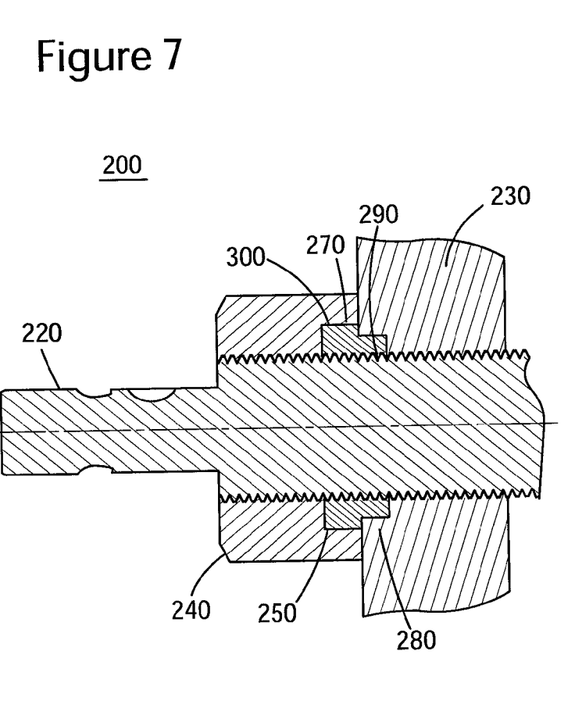
FIG. 7 is a schematic diagram of a cross section of a threaded joint according to an embodiment.

A cross section of the threaded joint 200 is illustrated in FIG. 7. The stem 220 goes through the flange 230 and the nut 240, along the axis 260. The flexible seal 250 is mounted between the flange 230 and the nut 240, around the stem 220. The flexible seal 250 fits inside the counter bore 280 of the flange 230 and the groove 270 of the nut 240.

In one application, the flexible seal 250 may be made from a material capable to endure a substantial amount of stress before suffering permanent deformation. For example, the flexible seal 250 may be made entirely of rubber or another polymer having rubber-like elasticity and compressibility. The material used for the flexible seal 250 may also be resistant to corrosion due to hydrogen sulfide ($H_2S$).

The nut 240 and the flexible seal 250 form a two piece sealing nut which render the threaded joint 200 capable to prevent leaking of fluids therethrough.

To assemble the threaded joint 200, e.g., in a gas processing installation, the stem 220 is rotated first to move along the axis 260 through the flange 230. Then, the flexible seal 250 is rotated to advance on the stem 220 until the first portion 290 of the flexible seal 250 fills a volume of the counter bore 280 inside the flange 230. In one application, the first portion 290 has an external diameter smaller than a diameter of the second portion 300.

The nut 240 is then rotated to advance on the stem 220 towards the flange 230 until the second portion 300 of the flexible seal 250 fills the groove 270 of the nut 240.

Then, a torque having a predetermined torque value is applied to the nut 240. For example, for a stem having a diameter of 2 inches, a torque of 800 foot pounds is applied, and, for a stem having a diameter of 2½ inches, a torque of 1000 foot pounds is applied.

The nut 240 may have an outer surface made of substantial rectangular sides, which form a hexagon in a cross-section perpendicular to the axis 260. However, the outer surface of the nut 240 is not limited to this hexagonal shape and may have other shapes. The nut 240 may be made of metal or other composite material considered a suitable substitute.

In one embodiment, the flexible seal 250 may be made of a polymer with a durometer value of about 75. A length of the flexible seal 250 may be chosen to enable the flexible seal support the predetermined torques. For example, the length may be 0.5 inch.

When the torque is applied to the nut 240, the flexible seal 250 is squeezed to tightly fit around the stem 220 and inside the groove 270 and the counter bore 280. The presence of the groove 270 and the counter bore 280 advantageously prevents a deformation of the flexible seal 250 between external faces of the nut 240 and the flange 230. Thus, the two piece nut sealing threaded joint formed by the nut 240 and the flexible seal 250 has an enhanced ability to prevent leaking of fluid therethrough.

Additionally, the threads 310 and the characteristics material used for the flexible seal 250 render the two piece threaded nut less prone to damage by shredding when the stem 220 rotates moving along the axis 260.

The geometry of the components of a threaded joint according to various embodiments has at least some of the following features: (a) a nut with a groove; (b) a flange having a counter bore; (c) a flexible seal having a first portion fitting in the groove of the nut, and a second portion fitting in a counter bore of the flange; and (d) an inner surface of the flexible seal with threads. These features separately or in combination lead to a threaded joint that is better than existing threaded joints in preventing leaking therethrough. The dimensions of the counter bore, the groove and the flexible seal are selected to allow a high enough torque to be applied to the nut. Choosing a material having appropriate characteristics for the flexible seal delays or prevents shredding. Also, by not having the flexible seal 250 exposed to the external faces of the flange 230 and the nut 240, the torque applied to the nut 240 and the flange 230 may damage less the flexible seal 250.

Figure 8:
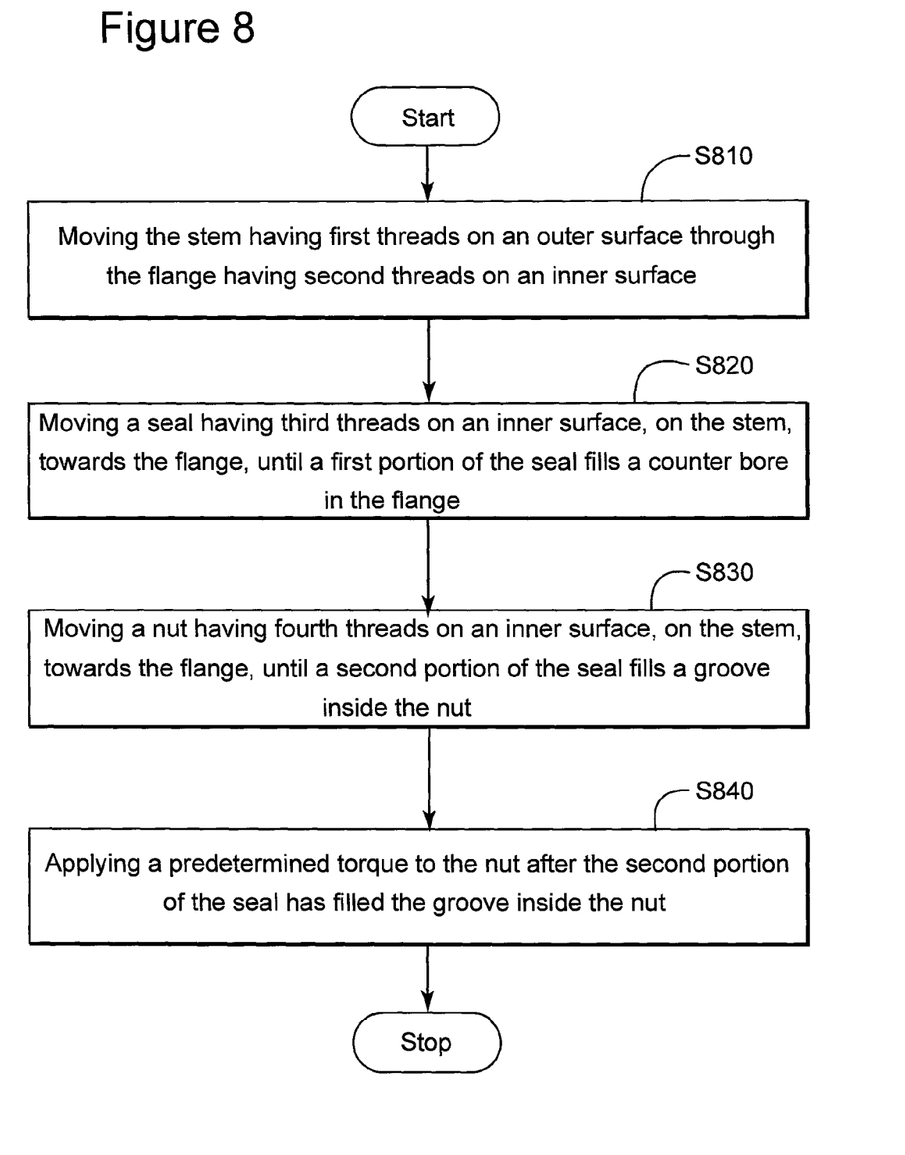
FIG. 8 is a flow diagram of a method of assembling a threaded joint according to an embodiment.

FIG. 8 illustrates a flow diagram of a method of sealing a threaded joint according to an embodiment. At S810, the method includes moving the stem (e.g., 220) having first threads on an outer surface, through the flange (e.g., 230) having second threads on an inner surface. The second threads have shapes complementary to the first threads.

Further, at S820, the method includes moving a flexible seal (e.g., 250) having third threads on an inner surface, on the stem (e.g., 220), towards the flange (e.g., 230), until a first portion (e.g., 290) of the flexible seal (e.g., 250) fills a counter bore (e.g., 280) in the flange (e.g., 230). The third threads have shapes complementary to the first threads.

At S830, the method includes moving a nut (e.g., 240) fourth threads on an inner surface, on the stem (e.g., 220), towards the flange (e.g., 230), until a second portion (e.g., 300) of the flexible seal (e.g., 250) fills a groove (e.g., 270) inside the nut (e.g., 240). The fourth threads have shapes complementary to the first threads.

Finally, at S840, the method includes applying a predetermined torque to the nut (e.g., 240) after the second portion (e.g., 300) of the flexible seal (e.g., 250) has filled the groove (e.g., 270) inside the nut (e.g., 240).

The disclosed exemplary embodiments provide a method of sealing a threaded joint, a threaded joint and a flexible seal with a longer life cycle and preventing better leaks than the conventional methods, threaded joints and flexible seals. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A threaded joint, comprising:
    a flange having threads on an inner surface and a counter bore, the threads having shapes complementary to threads on an outer surface of a stem, the flange being configured to allow the stem to move by rotation through the flange;
    a nut having threads on an inner surface and a groove, the threads of the nut having shapes complementary to the threads on the outer surface of the stem, the nut being configured to move by rotation relative to the stem; and
    a flexible seal having threads on an inner surface, the threads of the flexible seal having shapes complementary to the threads on the outer surface of the stem, the flexible seal being configured to move by rotation relative to the stem, and having a first portion configured to fill the counter bore in the flange, and a second portion configured to fill the groove of the nut.

2. The threaded joint of claim 1, wherein the flexible seal is made of a material resistant to corrosion due to hydrogen sulfide ($H_2S$).

3. The threaded joint of claim 1, wherein the flexible seal is made of a polymer with a durometer value of about 75.

4. The threaded joint of claim 1, wherein the first portion of the flexible seal has an outer diameter smaller than an outer diameter of the second portion.

5. The threaded joint of claim 1, wherein the nut has an outer surface made of rectangular sides which form a hexagon in a cross-section perpendicular to a rotation axis.

6. The threaded joint of claim 1, wherein the flexible seal is completely provided within the groove and the counter bore.

7. The threaded joint of claim 1, wherein the flexible seal is covered by the flange and the nut having no outer surface exposed to ambient.

8. The threaded joint of claim 1, wherein the threaded joint is formed around the stem having a first end inside a container which confines fluid having a high pressure, and a second end outside the container, the flange having one side towards an inside of the container, and one side towards outside of the container, the flexible seal and the nut being mounted on the stem outside of the container.

9. A method of sealing a threaded joint, comprising:
    moving a stem having first threads on an outer surface, by rotation, through a flange having second threads on an inner surface, the second threads having shapes complementary to the first threads;
    moving a flexible seal having third threads on an inner surface, by rotation, along the stem, towards the flange, until a first portion of the flexible seal fills a counter bore in the flange, the third threads having shapes complementary to the first threads;
    moving a nut having fourth threads on an inner surface, along the stem, towards the flange, until a second portion of the flexible seal fills a groove inside the nut, the fourth threads having shapes complementary to the first threads; and applying a predetermined torque to the nut after the second portion of the flexible seal has filled the groove inside the nut.

10. A two piece sealing nut for sealing a threaded joint including a stem having threads on an outer surface, the two piece sealing nut comprising:
   a nut configured to surround and move along the stem and having a groove; and
   a flexible seal configured to surround and move along the stem, inside a flange that holds the stem, and to have a first portion configured to fill a counter bore in the flange, and a second portion configured to fill the groove in the nut.

11. The two piece sealing nut of claim 10, wherein the flexible seal and the nut have threads on respective inner surfaces, the threads of the flexible seal and the nut having shapes complementary to shapes of the threads on the outer surface of the threaded stem.

12. The two piece sealing nut of claim 10, wherein the flexible seal is made of a material resistant to corrosion due to hydrogen sulfide ($H_2S$).

13. The two piece sealing nut of claim 10, wherein the flexible seal is made of a polymer with a durometer of about 75.

14. The two piece sealing nut of claim 10, wherein the first portion of the flexible seal has an outer diameter smaller than an outer diameter of the second portion.

15. The two piece sealing nut of claim 10, wherein the nut has an outer hexagonal surface.

16. The two piece sealing nut of claim 10, wherein the nut is made of metal or composite material.

17. The two piece sealing nut of claim 10, wherein the flexible seal is covered by the flange and the nut, having no outer surface.

18. The flexible seal of claim 17, wherein the flexible seal is made of a material resistant to corrosion due to hydrogen sulfide ($H_2S$).

19. The two piece sealing nut of claim 17, wherein the flexible seal is made of a polymer with a durometer of about 75.

20. A flexible seal, comprising:
   a first portion configured to fill a counter bore in a flange that holds a threaded stem; and
   a second portion configured to fill a groove of a nut, and having a diameter different from a diameter of the first portion, wherein
   the first portion and the second portion have threads on a surface of an inner hole configured to allow the flexible seal to move along the threaded stem, the threads of the flexible seal having shapes complementary to threads on an outer surface of the threaded stem.

* * * * *